May 9, 1967   J. W. ERICKSON   3,319,100
DYNAMOELECTRIC MACHINES

Filed Dec. 18, 1963   2 Sheets-Sheet 1

WITNESSES:
John L. Chopp
Edward F. Possessky

INVENTOR.
John W. Erickson
BY
F. P. Lyle
ATTORNEY

May 9, 1967  J. W. ERICKSON  3,319,100
DYNAMOELECTRIC MACHINES

Filed Dec. 18, 1963  2 Sheets-Sheet 2

INVENTOR.
John W. Erickson
BY
ATTORNEY

United States Patent Office 3,319,100
Patented May 9, 1967

3,319,100
DYNAMOELECTRIC MACHINES
John W. Erickson, Long Beach, Calif., assignor to Westinghouse Electric Corporation, Pittsburgh, Pa., a corporation of Pennsylvania
Filed Dec. 18, 1963, Ser. No. 331,607
2 Claims. (Cl. 310—168)

This invention relates to improvements in dynamoelectric machines, and more particularly to high speed alternators.

One of the chief obstacles to comparatively high speed operation (say 8000 r.p.m. or more) of alternators or other dynamoelectric machines is the fact that the magnitude of rotational forces can have a damaging effect on the structure of the machine rotor. In a wound alternator rotor, for example, such forces actually dislocate the rotor windings if the rotor speed is advanced excessively beyond the machine speed rating.

The transfer of excitation power to wound alternator rotors also constitutes a problem area which becomes increasingly difficult with increasing rotor speed. This is because the useful life of excitation power transfer elements, such as brushes and slip rings, is adversely affected by the contact heat and wear produced at the extended rotor speeds under consideration.

If the generation of only relatively small amounts of energy or power is a primary goal in alternator construction, a salient permanent magnet rotor could satisfy the foregoing high speed problems since the resulting machine would have neither brushes nor rotor windings. However, the feasibility of this approach to alternator construction rapidly diminishes as power generation goals are increased particularly since the excitation magnetomotive force obtainable from permanent magnet materials in appropriate geometries becomes insufficient for such increasing power goals.

On the other hand, an inductor alternator does eliminate the need for brushes while operating on excitation magnetomotive force obtained from an electrically powered D.C. stator winding. The resulting magnetic flux passes through milled rotor poles and returns to the stator in such a manner as to produce varying magnetic flux about an A.C. winding on the stator. Variance in flux, however, is about a given flux value without flux reversal and power generation is thus somewhat limited.

In the so-called Lundell alternator, magnetic flux reversal is achieved through oppositely polarized interdigitated poles on the machine rotor and a power advantage over the inductor generator is thereby gained through flux reversal. Simultaneously, rotor windings and brushes and the like can readily be eliminated to provide a basis for high speed operation.

Efficient high speed performance of a Lundell alternator does nonetheless require efficient organization and disposition of the alternator components. For example, it is preferable that the rotor be provided with well distributed bearing support for reliable high speed operation and further that it be characterized with rigidity. Hence, a Lundell rotor overhung from its shaft which is bearing mounted on one end of the machine may provide a known convenient manner for disposing a stationary excitation coil and core within the rotor but it also can restrict machine performance. Consequently if the excitation coil and core are to be disposed within the Lundell rotor, the resulting rotor and coil-core structure should efficiently provide the rotor support needed for the higher performance requirements. More generally, however, rotor support and excitation coil or coil and core disposition are best considered from the view point of achievement of overall operating advantages.

It is, accordingly, a principal object of the present invention to provide a novel dynamoelectric machine which can be efficiently operated with comparatively high speed.

Another object of the invention is to provide a novel brushless alternator which can be efficiently operated with comparatively high speed and which can efficiently generate comparatively high levels of electric energy.

A further object of the invention is to provide a novel Lundell machine having a rotor which is efficiently supported by a load distributing rotor bearing arrangement so as to permit efficient high speed operation.

An additional object of this invention is to provide a novel Lundell alternator in which exciting coil means are efficiently disposed and supported for high speed and high power operation of the alternator.

Another object of the invention is to provide a novel Lundell alternator in which the excitation coil means and flux return path are external of the rotor so as to permit greater flexibility in selecting the coil size and so as to permit much higher power generation than has been obtainable from internal return path constructions employed in prior art.

In accordance with the broad principles of the invention, a dynamoelectric machine or alternator comprises a rotor having axially extending, circumferentially spaced, interdigitated magnetic poles or teeth and preferably having bearings which distribute the rotor load to opposite ends of a housing. The housing can be formed of magnetic material and contains a magnetic stator core providing a bore in which the rotor turns and having one or more stator windings from which an A.C. output can be taken. The housing also contains one or more excitation coils which are efficiently disposed and supported for producing excitation flux which polarizes the rotor teeth and traverses the rotor-stator air gap to induce voltage in the stator windings.

The foregoing and other objects, advantages, and features of the invention, and the manner in which the same are accomplished, will become more readily apparent upon consideration of the following detailed description in conjunction with the accompanying drawings, wherein.

Figure 1:
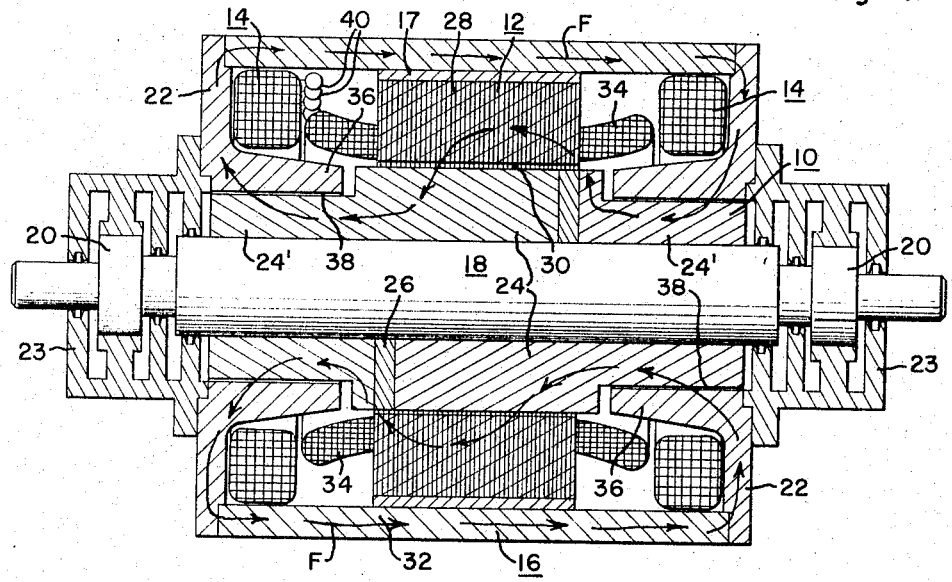
FIGURE 1 is a longitudinal sectional view of a first embodiment of the invention.

With reference to the drawings, and initially to FIG. 1 thereof, a preferred embodiment of an alternator of the invention comprises a rotor 10, a stator 12, and excitation coil means or coils 14 within a housing 16. The rotor 10 comprises a shaft 18 formed from a non-magnetic material such as stainless steel and supported adjacent its opposite ends by bearings 20. The bearings 20 are mounted on end plates 22 of the housing 16 in any conventional manner, as by bearing cups 23 and it is thus clear that the rotor load is efficiently distributed between the two end plates 22.

Figure 2:
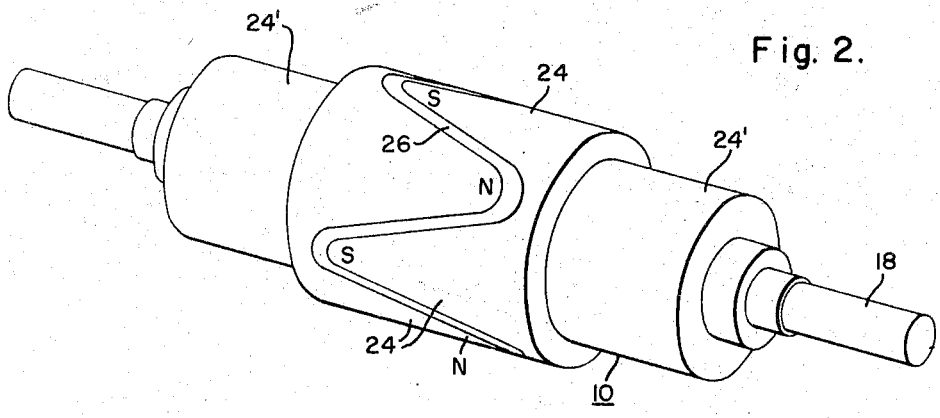
FIG. 2 is a perspective view of a typical rotor employed in the embodiment of FIG. 1.

The magnetic poles of the rotor are constituted by axially extending, elongated, tapered, and circumferentially spaced teeth 24 as shown more fully in FIG. 2. The teeth are formed of magnetic material, such as iron, and are fixed to the shaft 18 as by shrink fitting. As can be seen in the drawings, there are two sets or series of teeth, each series emanating from a common annular root 24'. The teeth extending from opposite ends of the rotor are interdigitated, so that the crests of the teeth extending from one end enter into the troughs between the teeth extending from the other end. The relatively wide gap or space between the interdigitated teeth is preferably filled with a non-magnetic material 26, such as aluminum, thereby to unite the entire rotor into a rigid integral structure capable of withstanding the forces associated with rotation at relatively high speed. The rotor 10 thus is substantially characterized with the speed capability of a solid rotating drum.

The stator 12 comprises a laminated magnetic core 28 which can advantageously be of the conventional induction motor type and which provides a bore to receive the rotor teeth 24 with a narrow annular gap 30 between the opposed surfaces of the core laminations and the rotor teeth. The stator core 28 is mounted upon annular wall 32 of the housing 16 with a suitably thick non-magnetic (such as brass or stainless steel) tubular member 17 disposed therebetween, and the core 28 supports a conventional stator winding or windings 34, which can be placed in axial slots formed in the stator core laminations in accordance with conventional procedures. The stator windings 34 can be connected in any appropriate circuit arrangement, such as three phase Y or delta connection.

The excitation coils 14 are preferably disposed and supported externally of the rotor 10 (where coil cooling is facilitated) and adjacent opposite ends of the housing and surround annular bosses 36 formed as extensions of the end plates 22 about the associated roots 24' of the rotor teeth, so as to provide narrow annular gaps 38 about the teeth roots. Excitation current for the coils 14 can be obtained from the stator windings 34 by rectifying a portion of the alternating current output. For this purpose suitable rectifiers are indicated at 40 and can comprise semiconductor diodes arranged in a conventional rectifier bridge, as is well known. The housing 16, including the end plates 22 and the bosses 36 as well as the main side wall 32, is formed of a magnetic material such as iron so as to provide a return path for the excitation flux externally of the rotor 10.

The excitation coils 14 provide excitation flux which follows the paths indicated generally by the arrows F, so that an axial flux is produced along the rotor to polarize the rotor teeth 24 in the manner of the Lundell-type rotor, successive teeth about the rotor circumference having opposite polarity as shown in FIG. 2. More specifically, flux entering the leftmost root 24' across the gap 38 is transmitted through the teeth 24 common to this root 24' and then across the rotor-stator gap 30 to the stator core 28. The flux then traverses a short circumferential distance about the core 28 to a point where it recrosses the rotor-stator gap 30 to the teeth 24 common to the other or rightmost root 24'.

Flux thus is transmitted between adjacent interdigitated teeth 24 through the core 28 rather than directly across the interdigitation space 26. This flux pattern is readily established by suitable design directed toward minimization of leakage flux across the space 26. Further, the non-magnetic member 17 substantially prevents flux transfer from the core 28 directly to the magnetic housing side wall 32.

From the rightmost root 24', flux crosses the rightmost gap 38 and returns to the starting point through the housing sidewall 32. Flux linkages with the stator windings are thus completed.

When the rotor is rotated, as by conventional prime mover, the residual magnetism in the teeth 24 provides flux lines which are directed in the manner just described and which cut the conductors of the stator winding 34 so as to produce an A.C. output, a portion of which is rectified and applied to the excitation coils 14 to create an excitation field. The A.C. output and the excitation field build up as the rotational speed increases, until the desired output is produced.

In the dynamoelectric machine of the invention saliency is obtained by employing the Lundell-type poles 24, which causes a complete reversal of the flux cutting the stator conductors as the poles of the rotor pass in succession beneath the stator conductors. The symmetrical construction of the rotor, with its balanced bearing arrangement, permits rotation at very high speeds and eliminates the adverse effects caused by the intrusion of bearings in the flux path.

The efficiency of the excitation arrangement, with its external flux return path, facilitates the generation of high power since the coils 14 can readily be varied in size to achieve stated power generation goals, and further since the cross-section of the flux gap adjacent each end of the rotor is comparatively larger than the corresponding section in internal path machines of the same machine diameter. Higher operating fluxes can thus be employed without encountering magnetic saturation. The simplicity and efficiency of the construction of the invention thus comparatively reduce the cost for a machine of given output.

While the external excitation flux return embodiment described in connection with FIGS. 1 and 2 is preferred, for the reasons set forth above, within the broader aspects of the invention certain advantages of the rotor construction can be obtained in dynamoelectric machines which employ internal flux return paths, that is, in which the excitation flux return path is internally of the rotor.

Figure 3:
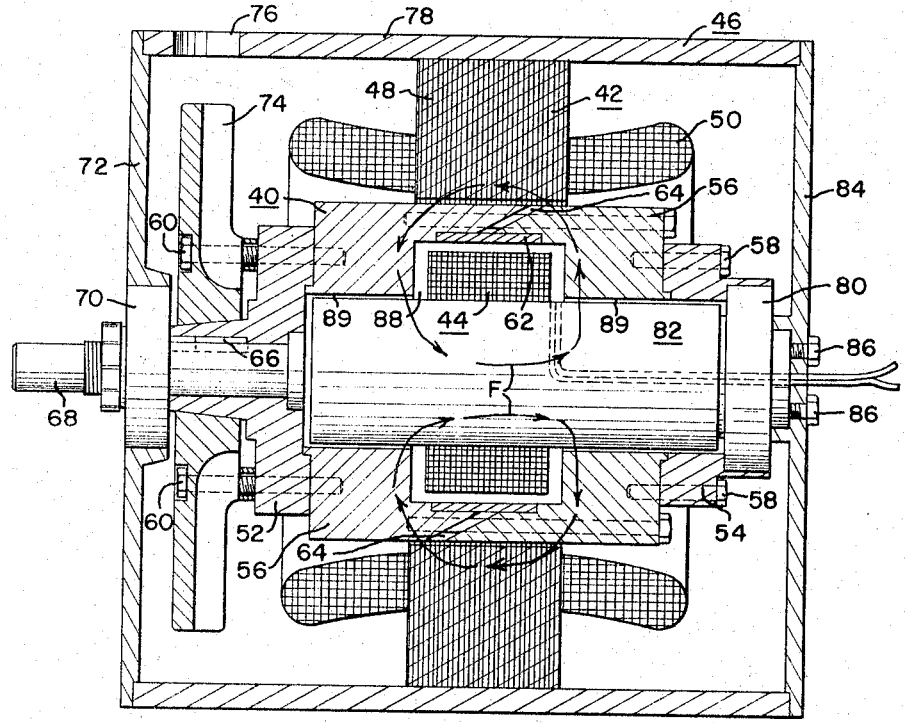
FIG. 3 is a longitudinal sectional view of another embodiment of the invention.

Such an embodiment is shown in FIG. 3, in which the dynamoelectric machine illustrated comprises a rotor 40, a stator 42, and excitation coil means or a coil 44. Since the flux return path is internally of the rotor, the casing or housing 46 can be formed of a non-magnetic material, such as an aluminum alloy. The stator 42 comprises a laminated magnetic core 48 and stator windings 50, which can have the construction previously described.

The rotor 40 comprises a pair of spaced hubs 52 and 54 of non-magnetic material for supporting the axially extending, circumferentially spaced, and interdigitated teeth 56, which can be fixed to the respective hubs 52 and 54 by means of axial screws 58 and 60 of non-magnetic material. A non-magnetic annular spacer 62 can be set into the teeth to maintain gap 64 between successive teeth and to provide further rigidity for the rotor assembly. As indicated by the inclination of the gap 64, the teeth can be tapered in elevation as well as in plan, and the outer configuration of the teeth can approximate that shown in FIG. 2, with alternate teeth extending from common annular roots affixed to the corresponding rotor hubs.

The hub 52 is keyed at 66 or otherwise affixed to a shaft 68, which can be formed of a non-magnetic material, such as an aluminum alloy. The shaft 68 is rotatably supported in a bearing 70 mounted upon end plate 72 of the housing 46. The hub 52 can also have affixed thereto, as by the screws 60, a conventional cooling fan 74, openings such as indicated at 76 in the side wall 78 of the housing being provided for circulation of air. The other hub 54 is fixed to the outer race of a suitable bearing 80 the inner race of which is preferably fixed to the end of a magnetic core member 82 which in turn is mounted upon the end wall or plate 84 of the housing, as by screws 86, and extended axially into the rotor.

The excitation coil 44 is supported upon the core member 82, which has a cylindrical configuration stepped down at the end adjacent the end plate 84 to receive the bearing 80. The excitation coil is received within annular space 88 between the opposed roots of teeth 56. Arrows F' indicate the path of the excitation flux for polarizing the magnetic teeth 56, the flux return path being through the core member 82 and across narrow gaps 89 between the core and tooth roots. The excitation flux further crosses the narrow gap between rotor and stator, cuts the conductors of the stator winding 50 as the rotor is turned and produces an alternating current output. As described previously, the excitation current can be obtained by rectifying a portion of the output.

The embodiment of FIG. 3 permits rotational support of the rotor from opposite ends of the housing 46 in a load distributing arrangement which is essentially symmetrical and in which, notwithstanding the internal flux return path, the bearings are outside of the flux path. Thus, many of the advantages offered by the preferred embodiment of FIGS. 1 and 2 are also obtainable in the embodiment of FIG. 3.

Figure 4:
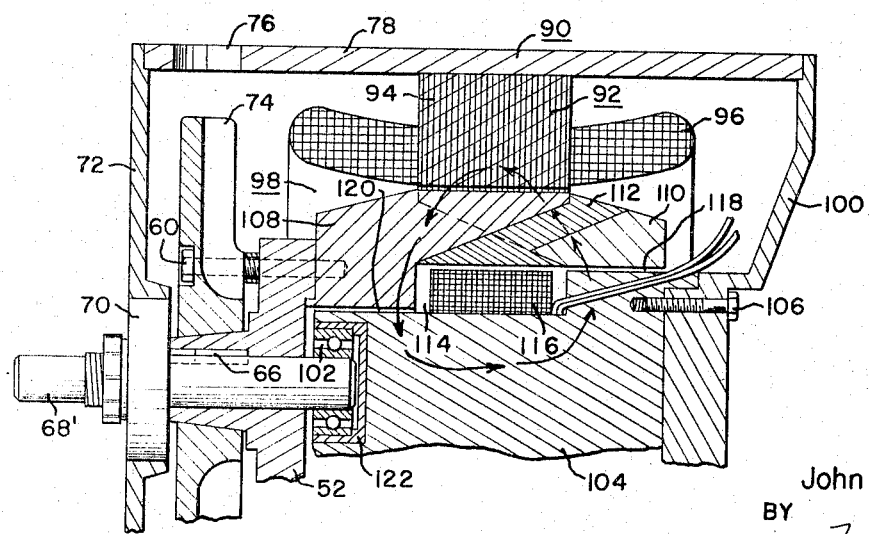
FIG. 4 is a fragmentary longitudinal sectional view of a modified form of the invention.

In the modification of FIG. 4 a somewhat different construction is employed. In this embodiment the rotor is unsupported at one end, but the use of a stepped excitation core permits a simple one-piece core construction and easier assembly and a bearing arrangement which, although not symmetrical, distributes the bearing load upon opposite end plates of the housing. In this form of the invention, the housing 90 can be of non-magnetic material, as in FIG. 3, because it does not provide the excitation flux return path. Mounted in the housing, as in FIG. 3, is the stator 92 having the stator magnetic core laminations 94 and stator windings 96 previously described. The rotor 98 comprises the single hub 52 keyed at 66 to drive shaft 68' as described in connection with FIG. 3. Again, the shaft turns in a bearing 70 mounted upon end plate 72 of the housing, but instead of the rotor 98 being mounted upon a second bearing adjacent the end plate 100 of the housing, a bearing is provided at 102 for rotatably supporting the shaft 68' upon one end of a core member 104. The core member is formed of magnetic material and is fixed at its other end to the end plate 100, as by screws 106, and the rotor load is thus divided between the end plates 72 and 100.

Again, the rotor comprises axially extending, circumferentially spaced, interdigitated magnetic teeth, with all the teeth supported from one end of the rotor. Teeth 108 have a common annular root fixed to the hub 52, as by non-magnetic screws 60, while the alternate teeth 110 and root thereof are supported from the teeth 108 by an intersecuring non-magnetic insert 112 which is disposed between the interdigitated teeth.

The rotor and the core 104 have mating stepped configurations to provide an annular space 114 for reception of the excitation winding 116 and to provide the narrow annular gaps 118 and 120 adjacent the roots of the respective series of teeth. The bearing 102 is set into the end of the core 104 and surrounded by a bushing cup 122, preferably non-magnetic so that the bearing is outside of the flux return path of the excitation coil 116, the return path being through the stepped core member 104 as in the embodiment of FIG. 3. The electrical operation of the modification of FIG. 4 is essentially the same as previously described.

While preferred embodiments of the invention have been shown and described, it will be apparent to those skilled in the art that changes can be made in these embodiments without departing from the principles of the invention.

Accordingly, the foregoing embodiments are to be considered illustrative rather than restrictive of the invention, and it is desired that the invention be interpreted consistently with the scope and spirit of its broad principles.

What is claimed is:

1. A dynamoelectric machine comprising a rotor cooperatively disposed in relation to a stator and having respective interdigitated sets of axially extending and circumferentially spaced magnetic poles, confronting edges of said interdigitated rotor pole sets intersecured by means of a non-magnetic spacing member, means at opposite ends of said rotor for rotatably supporting the same, and fixed excitation means mounted internally of said rotor for oppositely polarizing said interdigitated rotor pole sets and establishing flux linkages with said stator, said excitation means comprising an excitation coil mounted upon a fixed magnetic core, said core being step shaped in axial section, and said rotor having a mating step shape defining with said core a space within said rotor for receiving said excitation coil.

2. A dynamoelectric machine comprising a rotor cooperatively disposed in relation to a stator and having respective interdigitated sets of axially extending and circumferentially spaced magnetic poles, confronting edges of said interdigitated rotor pole sets intersecured by means of a non-magnetic spacing member, means at opposite ends of said rotor for rotatably supporting the same, and fixed excitation means mounted internally of said rotor for oppositely polarizing said interdigitated rotor pole sets and establishing flux linkages with said stator, said excitation means comprising an excitation coil mounted upon a fixed magnetic core, said magnetic core being substantially cylindrical and extending into one end of said rotor, said rotor having portions on opposite sides of said excitation winding in close proximity with said core and having a central opening to accommodate said excitation winding, said rotor supporting means comprising first bearing means supporting the rotor adjacent one end thereof and second bearing means supporting the rotor adjacent the other end thereof on said magnetic core.

References Cited by the Examiner

UNITED STATES PATENTS

| | | | |
|---|---|---|---|
| 468,121 | 2/1892 | Thomson | 310—168 |
| 588,602 | 8/1897 | Rice | 310—168 |
| 2,796,542 | 6/1957 | Bekey et al. | 310—168 |
| 2,806,159 | 9/1957 | Sheldon | 310—171 |
| 2,987,637 | 6/1961 | Bertsche et al. | 310—168 |
| 3,223,866 | 12/1965 | Tiltins | 310—168 |

MILTON O. HIRSHFIELD, *Primary Examiner.*

L. L. SMITH, *Assistant Examiner.*